Figure 1:
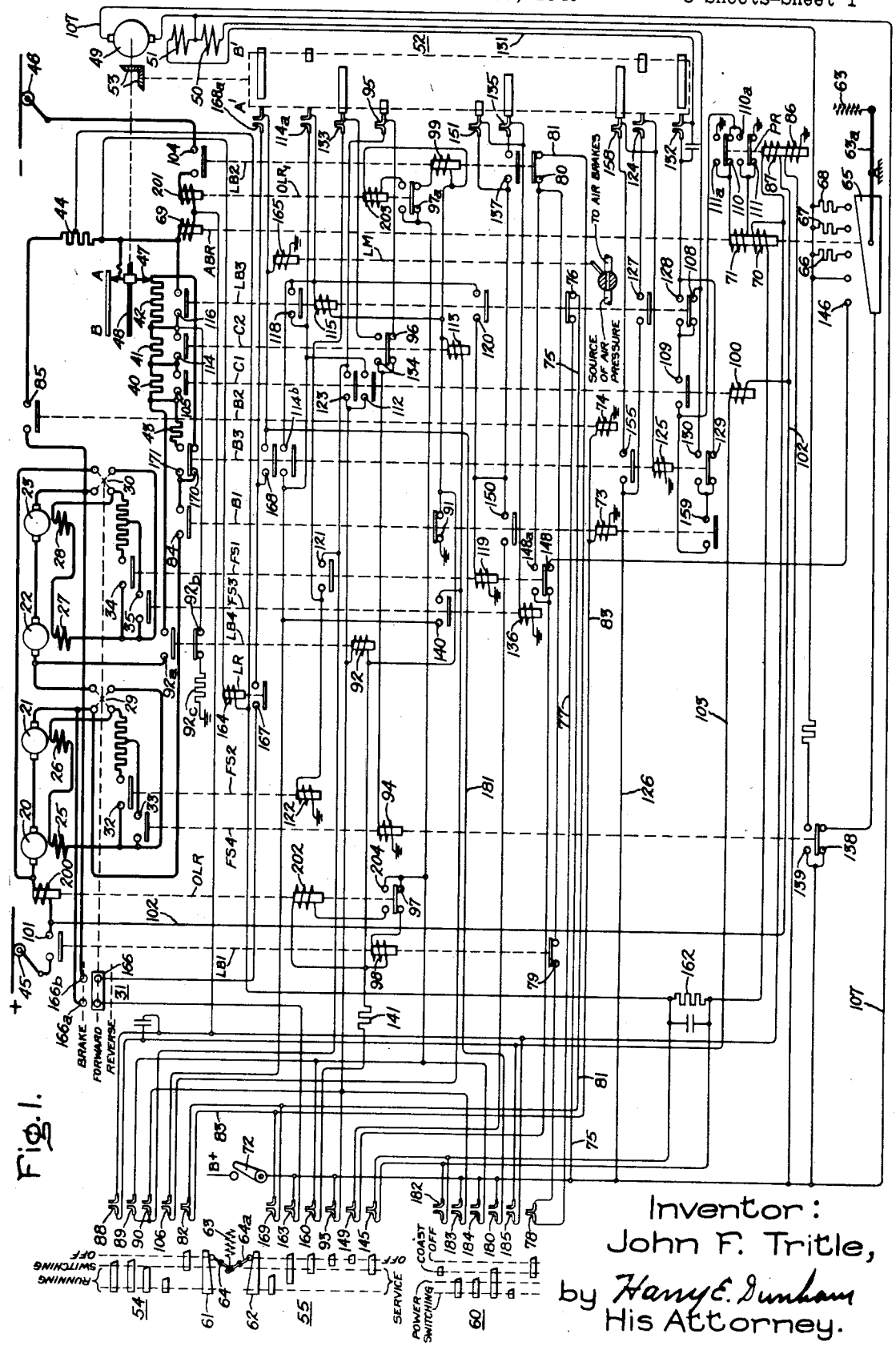

Dec. 9, 1941.  J. F. TRITLE  2,265,706
CONTROL SYSTEM
Filed Oct. 17, 1940  3 Sheets-Sheet 1

Inventor:
John F. Tritle,
by Harry E. Dunham
His Attorney.

Inventor:
John F. Tritle,
by Harry E. Dunham
His Attorney.

Dec. 9, 1941.    J. F. TRITLE    2,265,706
CONTROL SYSTEM
Filed Oct. 17, 1940    3 Sheets-Sheet 3

Inventor:
John F. Tritle,
by Harry E. Dunham
His Attorney.

Patented Dec. 9, 1941

2,265,706

UNITED STATES PATENT OFFICE 2,265,706

CONTROL SYSTEM

John F. Tritle, Erie, Pa., assignor to General Electric Company, a corporation of New York Application October 17, 1940, Serial No. 361,591

19 Claims. (Cl. 172—179)

My invention relates to control systems for electric vehicles such as railway cars, elevators and the like, and more particularly to an improvement upon the type of control system described in Patents 2,120,954 to Jacob W. McNairy and 2,120,956 to J. F. Tritle, both of which are assigned to the same assignee as the present application.

In dynamic braking arrangements for electric vehicles it is common practice to use the same resistor for dynamic braking as is used during the accelerating sequence of the vehicle for bringing the motors up to speed. During a normal braking sequence the resistor is included in a loop circuit with the traction motors, which are at that time acting as generators, and, as the speed of the vehicle is decreased, the value of the dynamic braking resistor is progressively diminished. If it is assumed that the entire resistor is to be included in the braking circuit when braking is called for at high speed, it is well understood in the art that it is desirable to include only a proportional amount of the resistance if braking is called for while the vehicle is traveling at any lower speed. The determination and setting of this proportional amount of resistance during a coasting period preceding the initiation of dynamic braking is referred to as "spotting." One arrangement by which the "spotting" operation may be satisfactorily carried out is disclosed in the above-mentioned Patent 2,120,954 issued to Jacob W. McNairy. In the patent referred to the dynamic braking circuits are established during coasting of the vehicle and the accelerating and braking relay is arranged to vary the amount of resistance to be included in the braking circuit in accordance with the speed of the vehicle.

As described above, spotting systems used in connection with dynamic braking arrangements are designed to operate during a period of coasting immediately preceding the establishment of dynamic braking, or, if no coasting period intervenes, spotting will occur during the first part of the braking period. But, in such systems, if braking is called for at some intermediate point during the accelerating sequence with no intervening coasting period, there may be a noticeable time delay between the initiation of braking and the obtaining of a suitable value of braking resistance for the speed of the vehicle.

Accordingly, it is an object of my invention to provide a control system arranged to include in the dynamic braking circuit of an electric vehicle an amount of resistance proportional to the speed at which the vehicle is traveling at the moment of establishment of the dynamic braking circuit, regardless of whether braking is called for during or after the completion of the accelerating cycle and regardless of whether a period of coasting intervenes between the accelerating period and the braking period.

Another object of my invention is to provide a control system for an electric vehicle arranged to permit a smooth reapplication of power with the vehicle in motion and immediate continuance of acceleration after a period of coasting or braking.

A further object of my invention is to provide smooth acceleration of an electric vehicle and a plurality of decelerating steps greater than the number of accelerating steps, while using the same resistor for both purposes.

A still further object of my invention is to provide safety interlock means whereby, if motoring and braking are simultaneously called for, braking alone will always result.

According to my invention the accelerating and braking resistor is so connected that a suitable amount of braking resistance will be included in the dynamic braking circuit in the event that immediate braking is called for at any time during the accelerating sequence. In order to effect this result I provide switching means for including the accelerating and braking resistor in the dynamic braking circuit in one of a plurality of possible circuit relations, the particular circuit relation being selected in accordance with the speed of the vehicle at the moment of transfer from accelerating to braking connections. This means is operative immediately upon the removal of power from the motor and before the usual spotting operation takes place. I also provide means for "spotting" the accelerating and braking resistor in the event that a period of coasting intervenes between the removal of power from the motor and the initiation of dynamic braking.

My invention also includes means for including, in an accelerating circuit reestablished after a period of coasting or braking, an amount of resistance proportional in accordance with the speed of the vehicle upon the reestablishment of acceleration.

By my invention means are also provided for smoothly accelerating and decelerating a vehicle so that the individual steps of acceleration are imperceptible to the passengers in the vehicle. To this end I provide means for utilizing the braking resistor twice during the decelerating cycle, thus effectively doubling the increments of resistance cut out during braking.

According to my invention separate switching means are provided for motoring and for braking and separate controllers are operative during these respective sequences, the controllers being so interlocked that the braking controller will always take precedence over the other if both are operated simultaneously.

Figure 7:
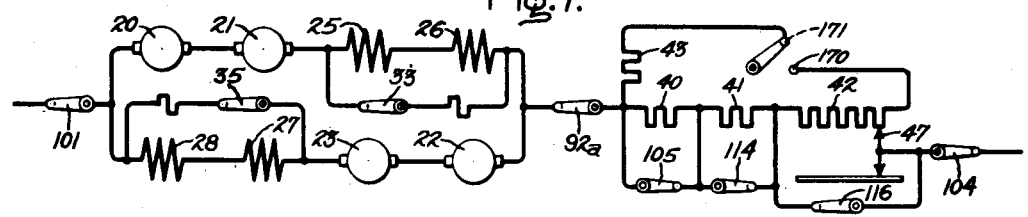
Figure 8:
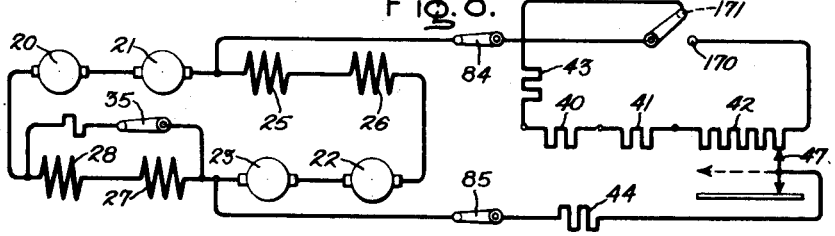
Figure 11:
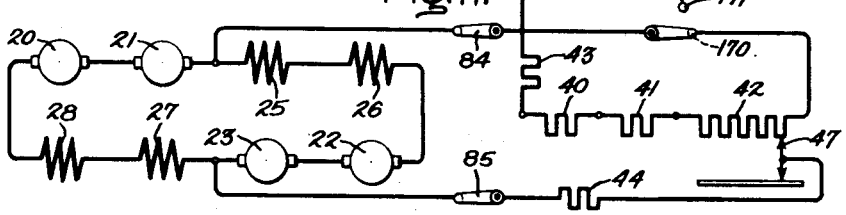
Figure 12:
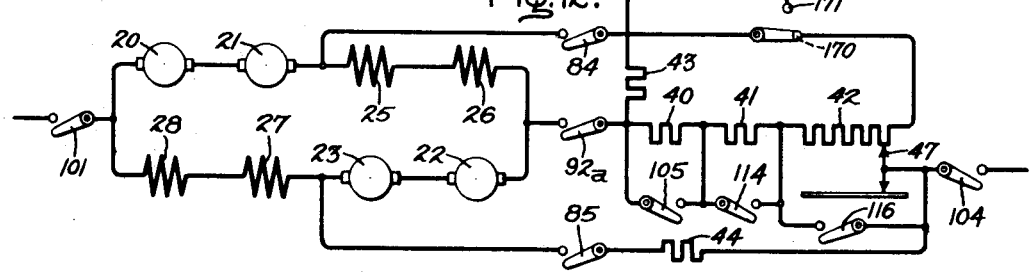

The novel features which I consider characteristic of my invention will be pointed out with particularity in the appended claims. For a better understanding of the invention itself, however, as well as for a further appreciation of the objects and advantages thereof, reference may be had to the accompanying drawings in which Fig. 1 is a circuit diagram showing the connections of the power and control circuits in an electrically driven vehicle provided with a dynamic braking arrangement according to my invention, Figs. 2 to 7, inclusive, are simplified circuit diagrams showing various stages of the accelerating sequence of the motor, Fig. 8 is a simplified circuit diagram showing the connections of the power circuit when the vehicle is coasting, Figs. 9 to 11, inclusive, are simplified circuit diagrams showing various stages during the braking sequence of the vehicle, and Fig. 12 is a simplified circuit diagram showing all the power circuit connections with the switches in their energized positions to illustrate how the motoring, coasting or braking circuits may be set up by closing the proper switches.

Referring now to the drawings, and particularly to Fig. 1, I have shown the power circuits and control circuits for an electric vehicle control system embodying my invention. As shown the power circuit includes a plurality of traction motors 20, 21, 22 and 23. Series field windings 25, 26, 27 and 28 for the motors 20, 21, 22 and 23 respectively are connected to the motor circuit through reversing switches 29 and 30 operated by a manually operable reverser 31. The series field windings 25 and 26 are arranged to be shunted by a circuit of variable resistance through contacts 32 and 33 of field shunting switches FS2 and FS4, while the series field windings 27 and 28 may be shunted by a circuit of variable resistance through contact 34 and 35 of field shunting switches FS1 and FS3. The traction motors are permanently connected in two series groups comprising the motors 20, 21 and the motors 22, 23 respectively, and these series groups are permanently connected in parallel.

A plurality of motor controlling resistors 40, 41 and 42 are provided for selectable connection in a common series circuit with the series-parallel motor group during acceleration of the motor. Additional resistors 43 and 44 are arranged for connection in a dynamic braking circuit with the resistors 40, 41 and 42. For acceleration the motors and their controlling resistances may be connected to the positive side of a direct current power line through a line circuit breaker LB1 and a trolley 45 and to the negative side through a line circuit breaker LB2 and a trolley 46.

The resistance of the main accelerating and braking resistor 42 may be varied, by way of example, by the movement of a brush arm 47 along a threaded shaft 48 rotated by a pilot motor 49. The pilot motor 49 is provided with a field winding 50 for rotation in one direction to move the brush arm 47 from its position A toward its position B, and is provided with a field winding 51 for rotation in the other direction to move the brush arm 47 from its position B toward its position A. A rotatable drum controller 52 is operated by the pilot motor 49 through a plurality of beveled gears 53 and consequently in synchronism with the movement of the brush arm 47. The controller 52 moves between two extreme positions A' and B' corresponding respectively to the positions A and B of the brush arm 47, and includes a plurality of cam switches connected in the control circuit which will be described below.

As shown in Fig. 1, my control system is provided with a master accelerating controller 54, a braking controller 55 and a back up controller 60. Each of the controllers 54, 55 and 60 may be independently and manually operated, and are arranged to control a plurality of contact fingers in the control circuit which will be described below. A cam 61 on the controller 54 and a cam 62 on the controller 55 are arranged independently to tension a calibrating spring 63 through the lever arms 64 and 64a. The spring 63 acts through a lever arm 63a to restrain the armature of the relay ABR. The relay may therefore be calibrated by movement of either the controller 54 or the controller 55.

The accelerating and braking relay ABR is provided with a contact strip 65 cooperating with a plurality of resistors 66, 67 and 68 to control the speed of the pilot motor 49 driving the brush arm 47 of the accelerating and braking resistor 42. The relay ABR may be energized either by a series operating coil 69 connected in the power circuit and effective while the vehicle is motoring, or by a shunt operating coil 70 connected across a portion of the braking resistance 44 and effective during dynamic braking. A regulating coil 71 carrying the current to the pilot motor sets up a force opposing the operating force and gives the relay a vibrating action. As the relay contacts are closed, gradually to shunt the armature of the pilot motor, the increased current through the regulating winding 71 bucks down the flux of the operating coil. The result is a fluttering action of the relay contacts which is reflected in a variable speed of the brush arm 47 from maximum to minimum depending upon the degree of acceleration or braking being called for by the operator. The degree of acceleration or braking being called for is determined by the degree of rotation of the drum 54 or the drum 55, since the position of either of these controllers determines the amount of tension applied to the calibrating spring 63 which restrains the relay ABR.

It is believed that a complete understanding of my invention may best be had from a description of the mode of operation of the system as a whole. The mode of operation of my system may best be described by tracing each step of a normal accelerating and braking squence.

Figure 2:
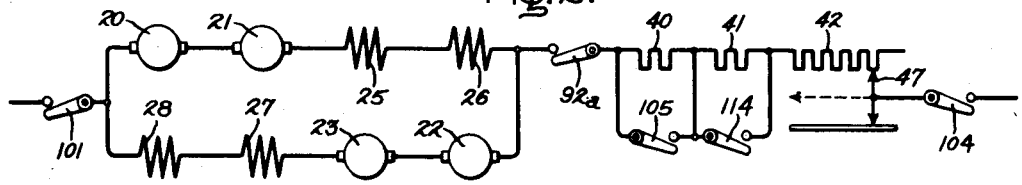

With the vehicle at rest the elements of the control system are in their deenergized positions as shown in Fig. 1 and the power circuit appears as shown in Fig. 2. In Fig. 1 the manually operated controllers 54, 55 and 60 are shown in their "off" positions. If it is assumed that the reverser 31 is in its position for forward operation of the vehicle, as shown in Fig. 1, power may be applied to the control circuit by closing the manually operated control switch 72. As soon as the control switch 72 is closed with the controllers 54, 55 and 60 in their "off" positions, energizing circuits are established for operating windings 73 and 74 of braking contactors B1 and B2 respectively. These circuits may be traced from B+, through the control switch 72, the wire 75, a pair of contacts 76 of the line breaker LB3, the wire 77, the contact finger 78 of the back-up controller 60, the contacts 79 of the line breaker LB1, the contacts 80 of the line breaker LB2, the wire 81, the contact finger 82 of the master accelerating controller 54, the wire 83, and in parallel through the coils 73 and 74 to ground. The braking circuits are now established through the contacts 84 and 85 of the contactors B1 and B2 respectively with the vehicle at standstill. The operation of the braking contactors B1 and B2 connects the traction motors so that, if driven by the momentum of the vehicle, they will act as series generators. Current generated in the armatures of the motors 22 and 23 flows through the field windings of the motors 20 and 21, while the field windings of the motors 22 and 23 carry the current generated in the armatures of the motors 20 and 21.

As soon as the control switch 72 is closed an energizing circuit is also established for a battery coil 86 of a polarity relay PR. As will appear hereinafter, the polarity relay PR determines the direction of flow of current through the regulating winding 71 of the accelerating and braking relay ABR. The circuit for the coil 86 will be obvious. The polarity relay PR is also provided with a trolley coil 87 responsive to the polarity of the power voltage. When the trolley 45 is positive the flux of the coil 87 will buck the flux of the coil 86 and the relay PR will not pick up. If, on the other hand, the trolley 45 is negative, the flux of the coil 87 will boost the flux of the coil 86 and the relay PR will be energized. In this latter case the pilot motor current will flow in the opposite direction through the regulating winding 71 of the relay ABR to compensate for the change in direction of the current flow in the coil 70 of the relay ABR due to the change in polarity of the trolley. It will be assumed that the trolley 45 is positive.

If the master accelerating controller 54 is now moved to its "switching" position the contact fingers 88, 89 and 90 are closed successively in the order named, and the contact finger 82 is opened. The opening of the contact finger 82 breaks the energizing circuit previously traced for the operating coils 73 and 74 of the braking contactors B1 and B2 respectively. The braking contactors B1 and B2 therefore drop out. When the contactor B1 drops out, it closes its contacts 91 to complete an energizing circuit for the operating coil 92 of the line breaker LB4. This circuit may be traced from B+, through the control switch 72, the contact finger 93 of the braking controller 55, the operating coil 92 of the line breaker LB4 and the contacts 91 of the contactor B1 to ground. When the breaker LB4 picks up it closes its contacts 92a to connect the driving motors to the starting resistors. Through the contact finger 93 a circuit is also established to energize the operating coil 94 of the field shunting switch FS4. This circuit may be traced from B+ through the control switch 72, the contact finger 93 of the braking controller 55, the contact finger 90 of the master accelerating controller 54, the contact finger 95 of the controller drum 52, the normally closed contacts 96 of the cushioning contactor C2 and the operating coil 94 of the field shunting switch FS4 to ground. Through the contact finger 93 of the braking controller 55 and the contact finger 90 of the accelerating controller 54 energizing circuits are also established for the operation of the line breakers LB1 and LB2. The energizing circuit for the line breaker LB1 may be traced from B+ through the control switch 72, the contact finger 93, the contact finger 90, the contact finger 89 of the accelerating controller 54, the contacts 97 of an overload relay OLR, the operating coil 98 of the line breaker LB1, and the contacts 91 of the contactor B1 to ground. From the contact finger 89 of the controller 54 a parallel energizing circuit for the operating coil 99 of the line breaker LB2 may be traced through the contacts 97a of an overload relay OLR1, the operating coil 99 of the line breaker LB2 and the contacts 91 of the contactor B1 to ground.

When the line breakers LB1, LB2 and LB4 are closed the motors 20, 21, 22 and 23 are connected across the line between the trolley 45 and the trolley 46 in series with the resistors 40, 41 and 42. With the line breakers LB1 and LB2 closed an energizing circuit is completed through the operating coil 100 of the cushioning contactor C1. This control circuit is energized by the voltage across the traction motors, and may be traced from the trolley 45, through the contacts 101 of the line breaker LB1, the wire 102, the operating coil 100 of the cushioning contactor C1, the wire 103, the contact finger 88 of the master controller 54 and the contacts 104 of the line breaker LB2 to the trolley 46. When the contactor C1 picks up it closes its contacts 105 to short circuit the resistor 40 and remove it from the accelerating circuit.

Figure 3:
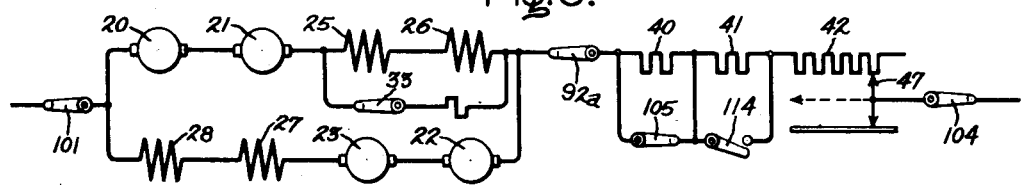

Therefore, with the master controller 54 held in its "switching" position, the traction motors are connected to the line through the accelerating resistors 41 and 42, and fields of the motors 20 and 21 are shunted through the contacts 33 of the field shunting switch FS4. The condition of the power circuit is shown in Fig. 3. If the master controller 54 is held in the "switching" position, that is, without closing the contact finger 106 of the master controller 54, the pilot motor 49 will operate to remove resistance very slowly from the circuit until the motors are connected directly across the line. This is the lowest rate of acceleration which may be secured. Soon after the controller 52 leaves its A' position in this sequence it disables the operating coil 94 of the switch FS4 at the contact finger 95 of the controller. The energizing circuit for the pilot motor 49 may be traced from B+, through the control switch 72, the wire 107, the armature of the pilot motor 49, the field winding 50 of the pilot motor, the contacts 108 of the line breaker LB3, the contacts 109 of the cushioning contactor C1, the contacts 110 of a polarity relay PR, the regulating coil 71 of the relay ABR, and the contacts 111 of the polarity relay to ground. Had the trolley voltage been assumed negative the circuit would have included the contacts 110a and 111a of the relay PR instead of its contacts 110 and 111 respectively. If acceleration is allowed to progress with the controller 54 in the "switching" position, the resistor 42 will be cut out and the motor fields shunted in the usual manner as will be described below. The only difference between this sequence and a normal accelerating sequence at a higher rate of acceleration is that with the controller 54 on "switching" the cushioning contactor C2 will not pick up until the switch FS3 is energized. In picking up the switch FS3 will close its interlock contacts 153 which shunt the contact finger 106 of the controller 54 and complete an energizing circuit for the operating coil 113 of the contactor C2 as will be described hereinafter.

Figure 4:
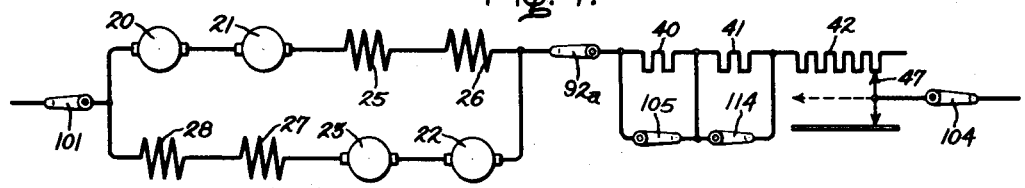
Figure 5:
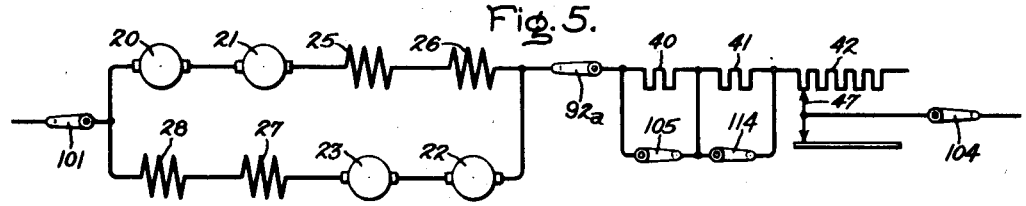

If the master accelerating controller 54 is advanced sufficiently far in its "running" position to close the contact finger 106, an energizing circuit is set up for the operating coil of the cushioning contactor C2. This energizing circuit may be traced from B+, through the control switch 72, the contact finger 93 of the braking controller 55, the contacts 112 of the contactor C1, the contact finger 106, the operating coil 113 of the cushioning contactor C2 and the contacts 91 of the contactor B1 to ground. When the contactor C2 is energized it picks up to close its contacts 114 and thereby removes the resistor 41 from the motor circuit. When the contactor C2 picks up it also opens its contacts 96 to disable the energizing circuit for the operating coil 94 of the field shunting switch FS4. The switch FS4 therefore drops out so that full voltage is applied to the fields of the motors 20 and 21. This stage of the accelerating sequence is illustrated in Fig. 4.

The operation of the cushioning contactor C2 has no effect upon the energizing circuit for the pilot motor 49 previously traced. The pilot motor 49 therefore operates to advance the brush arm 47 from A toward B and remove the resistor 42 from the motor circuit at a rate governed by the setting of the accelerating relay ABR. The relay ABR functions to connect varying amounts of resistance across the armature of the pilot motor. As has been previously described, the calibration of the accelerating and braking relay ABR may be changed by advancing the master controller 54 within the limits of its "running" position and thereby applying greater or less tension to the restraining spring 63 of the relay. For any particular position of the master controller 54 the relay ABR operates to maintain a constant current in the motor circuit. This operation is carried out under the influence of series coil 69 and the regulating coil 71 of the relay ABR. If the traction motor current tends to build up beyond the predetermined desired value, the series coil 69 picks up the armature of the relay ABR to close a shunt circuit around the armature of the pilot motor 49. A contact segment 65 and a plurality of resistors 66, 67 and 68 are so arranged that the shunt circuit around the armature of the pilot motor 49 is progressively diminished in resistance as the armature of the relay ABR is picked up. However, when a shunt circuit is closed around the armature of the pilot motor 49 the regulating coil 71 of the relay ABR, which carries the sum of the current through the armature of the motor 49 and its shunt, tends to buck down the operating flux of the series coil 69 and permits the armature of the relay to drop out. The result is a fluttering action on the relay contacts which takes place rapidly and is reflected in a variable speed of the brush arm from maximum to minimum. If any other "running" position of the master controller 54 is selected, the operation of the relay ABR is the same except that the pick-up point is changed in accordance with the position of the master controller. The position of the master controller 54 therefore determines the magnitude of the constant current maintained in the accelerating circuit by the relay ABR. As soon as the brush 47 arrives at B the power circuit will appear as at Fig. 5.

As the brush arm 47 approaches its B position a contact finger 114a is closed by the drum controller 52. The contact finger 114a completes an energizing circuit for an operating coil 115 of the line breaker LB3. This energizing circuit may be traced from B+ through the control switch 72, the contact finger 93, the contacts 112 of the contactor C1, the contact finger 114a, the operating coil 115 of the line breaker LB3, and the contacts 91 of the contactor B1 to ground. The line breaker LB3 now picks up and closes its contacts 116 to short circuit the variable motor controlling resistor 42. In picking up the line breaker LB3 seals itself in through its contacts 118 which shunt the contact finger 114a of the controller 52. The contact finger 114a of the controller 52 is also shunted by an interlock contact 114b on the braking contactor B3. The interlock contact 114b is operative upon the reapplication of power under certain conditions as will become more apparent hereinafter.

The picking up of the line breaker LB3 produces a further increase in the speed of the traction motors 20, 21, 22 and 23 by completing energizing circuits for the field shunting switch FS1. The energizing circuit for the operating coil 119 of the switch FS1 may be traced from B+ through the control switch 72, the contact finger 93 of the controller 55, the contacts 112 of the contactor C1, the contacts 118 of the line breaker LB3, the contacts 120 of the line breaker LB3, and the operating coil 119 of the switch FS1 to ground. When the switch FS1 picks up it closes its contacts 34 to place a high resistance shunt across the field windings 27 and 28 of the traction motors 22 and 23 and also closes its interlock contacts 121 to complete an energizing circuit for the operating coil 122 of the field shunting switch FS2. The energizing circuit for the operating coil 122 may be traced from B+ through the control switch 72, the contact finger 93 of the controller 55, the contacts 123 of the contactor C1, the contacts 121 of the switch FS1, and the operating coil 122 of the switch FS2 to ground. The switch FS2 now picks up to provide an additional step in acceleration by closing its contacts 32 to place a high resistance shunt across the series fields 25 and 26 of the traction motors 20 and 21.

Figure 6:
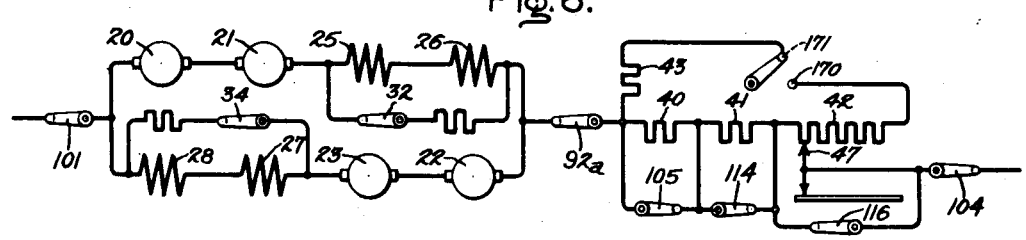

In the B' position of the controller 52 a contact finger 124 is also closed to complete an energizing circuit for the operating coil 125 of the braking contactor B3. When the contactor B3 picks up it causes no change in the motoring circuit. This contactor is energized only as a preparatory step for the dynamic braking sequence which will be described hereinafter. The energizing circuit for the braking contactor B3 is established by the operation of the contact finger 124 and the line breaker LB3, and this circuit may be traced from B+ through the control switch 72, the wire 126, the contacts 127 of the line breaker LB3, the contact finger 124 of the pilot motor controller 52 and the operating coil 125 of the contactor B3 to ground. The power circuit connections are now as shown at Fig. 6.

When the line breaker LB3 picks up to short circuit the accelerating resistor through its contacts 116 it also opens its interlock contacts 108 and closes its interlock contacts 128 which, in cooperation with the contacts 120 and 130 of the contactor B3, disable the field winding 50 and energize the field winding 51 of the pilot motor 49. This results in a reversal of the direction of rotation of the pilot motor 49 so that the brush arm 47 is moved back from its position B to its position A. The newly established circuit for the pilot motor 49 may now be traced from B+ through the control switch 72, the wire 107, the armature of the pilot motor 49, the field winding 51 of the pilot motor 49, the wire 131, a contact finger 132 of the pilot motor controller 52, the contacts 128 of the line breaker LB3, the contacts 109 of the contactor C1, the contacts 110 of the polarity relay PR, the regulating coil 71 of the accelerating braking relay ABR and the contacts 111 of the polarity relay to ground. The brush arm 47 is now moved backwards from its position B to its position A, but, since the accelerating and braking resistor 42 is short circuited by the contacts 116 of the line breaker LB3, no change occurs in the resistance of the motor circuit. By moving back towards the A position the brush arm 47 is preparing to insert additional resistance in the braking circuit as the speed of the cars increases. However, the backward movement of the pilot motor also results in moving the controller drum 52 from its position B' back to its position A'. During the course of this movement of the controller drum 52 circuits are established for the energization of the field shunting switches FS3 and FS4. When the switches FS3 and FS4 are picked up the resistance of the shunt circuit around the series field windings of the traction motors is decreased in order to permit the traction motors to operate at their highest speed. The energizing circuit for the field shunting contactor FS4 may be traced from B+ through the control switch 72, the contact finger 93 of the braking controller 55, the contacts 123 of the contactor C1, the contacts 121 of the field shunting switch FS1, a contact finger 133 of the pilot motor controller 52, the contacts 134 of the contactor C2 and the operating coil 94 of the field switch FS4 to ground. Shortly after the closing of the contact finger 133 of the pilot motor controller 52, a contact finger 135 of this controller is closed by its cooperating cam. Through the contact finger 135 a circuit is completed for the energization of the operating coil 136 of the field shunting switch FS3. This circuit may be traced from B+ through the control switch 72, the contact finger 93 of the braking controller 55, the contacts 112 of the contactor C1, the contacts 118 of the line breaker LB3, the contacts 120 of the line breaker LB3, the contacts 137 of the line breaker LB2, the contact finger 135 of the pilot motor controller 52 and the operating coil 136 of the field switch FS3 to ground. With the closing of the field shunting switches FS3 and FS4 the shunt circuits around the series fields of the traction motors 20, 21, 22 and 23 are diminished in resistance and the motors are thereby brought to their maximum speed. It will also be noted that when the shunting switch FS4 picks up it opens its interlock contacts 138 and substantially simultaneously closes a second pair of interlock contacts 139. The opening of the contacts 138 and the closing of contacts 139 results in removing the speed regulating contacts of the accelerating and braking relay ABR from the pilot motor circuit and substituting therefor a fixed resistance. This connection removes speed control from the accelerating relay and cause the brush arm 47 to move at reduced speed the remainder of the way back to its A position. It will also be noted that when FS3 picks up it closes a pair of interlock contacts 140 to place a shunt around the contact finger 106 of the controller 54.

It will be recalled that during the reverse movement of the pilot motor 49 to move the brush arm 47 from position B to position A the circuit for the pilot motor passes through the contact finger 132 of the pilot motor controller 52. It will therefore be apparent that when the brush arm 47 approaches its A position, while the controller 52 simultaneously approaches its A' position, the contact finger 132 will be opened by its cooperating cam on the controller drum 52 and the pilot motor will thereby be deenergized. During this reverse movement the line breaker LB3 has been maintained in picked-up position by its interlock contacts 118. With the vehicle now operating at its maximum speed the power circuit connections are as shown in Fig. 7.

*Removal of power*

If the master accelerating controller 54 is now moved back to its "off" position, my invention provides a smooth cushioned shut-off of power regardless of the speed of the vehicle when this operation is carried out. This cushioned shut-off of power is carried out by the insertion of the accelerating resistors into the motor circuit sequentially before the line breakers are opened.

The normal sequence of shutting off power is to open the contactor C1, then the contactor C2 and the line breaker LB3, and finally the line breakers LB1 and LB2. By referring to the foregoing specification it will be observed that the energizing circuit for the line breaker LB3 passes through the interlock contacts 112 of the contactor C1. The breaker LB3 therefore will not open until the contactor C1 has opened. Also, the energizing circuit for the contactor C2 passes through the same contacts 112 of the contactor C1 and in series through the contacts 140 of the field switch FS3. It will further be recalled that the energizing circuit for the contactor C1 is across the line voltage rather than the control voltage and includes only the single contact finger 88 of the master accelerating controller 54. Therefore, when the controller 54 is moved to "off" the contact finger 88 opens to deenergize the contactor C1. When the contactor C1 drops out it opens its contacts 112 to break the energizing circuit for the operating coil 113 of the contactor C2 and the energizing circuit for the operating coil 115 of the line breaker LB3. It will therefore be apparent that the resistors 40 and 41 and 42 are sequentially inserted in the motor circuit in the order named. Shortly before the opening of the line breaker LB3 the energizing circuits for the operating coils 98 and 99 of the line breakers LB1 and LB2 respectively were disabled by the contact finger 90 of the master controller 54. In order to prevent the dropping out of the breakers LB1 and LB2 before the opening of the breaker LB3 a non-inductive resistor 141 may be placed in shunt to the operating coils 98 and 99 of the breakers LB1 and LB2. The discharge resistor 141 gives the coils 98 and 99 sufficient delay in drop out to permit the prior dropping out of the breaker LB3.

If power is removed before any of the field shunting switches FS1, FS2, FS3 and FS4 have closed, the sequence in shutting off power is slightly altered. In this case the line breaker LB3 will not yet have closed, and the shutting-off sequence will be carried out by first dropping out the contactor C2, then the contactor C1, and finally the breakers LB1 and LB2. In this case the energizing circuit for the contactor C2 passes through the contact finger 106 of the controller 54 rather than through the contact 140 of the switch FS3. Since the contact finger 106 opens before the contact finger 88 in the circuit of the C1 operating coil, the contactor C2 opens first the discharge resistor 141, as previously described, delays the deenergization of the line breakers LB1 and LB2.

In the event that the braking controller 55 is advanced before the controller 54 reaches its "off" position, as in an emergency, I provide means for disabling the time delay resistor 141. This I do by providing a contact finger 145 on the controller 55. As soon as the controller 55 is placed in its "service" position the circuit through the resistor 141 is broken at the contact finger 145 to permit the immediate application of dynamic braking.

Coasting

With all the manual controllers in their "off" positions the control circuit is now set for coasting. As pointed out in the first part of this specification the dynamic braking circuits are established with the controllers 54 and 55 both in their "off" positions.

When the braking contactor B1 picks up it opens its interlock contacts 91 to deenergize the operating coil 92 of the line breaker LB4. When LB4 drops out it closes its contacts 92b and thereby connects the approximate center of the braking resistance to ground through a ground resistor 92c. This connection tends to keep the center of the resistor at ground potential and thus prevent an overvoltage on any motor.

Since the vehicle is now in motion the motors 20, 21, 22 and 23 will build up as generators and send a circulating current through the braking circuit. A very small braking current will pick up the relay ABR, since the calibrating spring 63 of the relay is under only slight tension. If this braking current is sufficient to pick up the relay ABR to close its last contact 146 an energizing circuit is completed for the operating coils 119 and 136 of the field shunting switches FS1 and FS3 respectively. These circuits may be traced from B+ through the control switch 72, the contacts 138 of the field shunting switch FS4, the contact strip 65 and the contact 146 of the relay ABR, the contacts 148 of the switch FS1, the contact finger 149 of the controller 55, the contacts 150 of the braking contactor B1, and in parallel through the coil 119 of FS1 to ground and the contact finger 151 of the controller 52 and the coil 136 of FS3 to ground. If coasting had been called for at a lower speed and before the controller 52 arrived at its A' position, the switch FS3 would not pick up since the contact finger 151 of the controller 52 would be open. If, however, coasting is called for before the controller 52 has arrived back at its A' position and before the speed of the vehicle is sufficient to build up a braking current large enough to pick up the relay ABR to its last contact 146, neither FS1 nor FS3 will close in coasting. Under the conditions assumed however, with a complete accelerating cycle preceding coasting and the vehicle traveling at its maximum speed both FS1 and FS3 will be picked up by the coasting current. When the switches FS1 and FS3 pick up the field windings 27 and 28 of the motors 22 and 23 are shunted through the contacts 35 of FS3 and a locking-in circuit is completed through a pair of contacts 148a of the switch FS1. The contacts 148a of the switch FS1 substitute the contacts 76 of the breaker LB3, the contact finger 78 of the controller 60 and the contacts 79 of the breaker LB1 for the contacts 147 of the switch FS4 and the contact 146 of relay ABR in the energizing circuit just traced for the switches FS1 and FS3.

With a complete acceleration, as described in the foregoing, the contactor B3 remains energized when power is shut off. It will be recalled that the contactor B3 was energized through the contact finger 124 of the controller 52. It may be observed from Fig. 1 that after the energization of the contactor B3 a pair of locking-in contacts 155 on the contactor B3 are closed. Also, since on the movement of the controller 52 from its position B' to its position A' a contact finger 158 is closed before the contact finger 124 is opened, a locking-in circuit around the contacts 127 of the breaker LB3 and the contact finger 124 of the pilot motor controller 52 is completed through the contacts 155 of the contactor B3 and the contact finger 158 of the pilot motor controller 52. The power circuit connections for coasting are shown at Fig. 8.

The position of the contacts 129 and 130 of the braking contactor B3 determines the direction of operation of the pilot motor 49 when braking is called for. The position of these contacts in turn is determined by how far the accelerating cycle has proceeded. Under the conditions assumed the contacts 130 of the contactor B3 are closed because the contactor B3 has picked up. A circuit is therefore established through the field winding 50 of the pilot motor 49 for operation of the motor 49 in a direction to move the brush arm 47 from its position A to its position B. This circuit may be traced from B+ through the control switch 72, the wire 107, the armature of the pilot motor 49, the field winding 50 of the pilot motor, the contacts 130 of the contactor B3, the contacts 159 of the contactor B1, the contacts 110 of the potential relay PR, the coil 71 of the relay ABR and the contacts 111 of the potential relay to ground. The dynamic braking circuit now established includes the resistors 43, 40, 41, 42 and 44 in series, as shown in Fig. 8, and the pilot motor 49 begins its operation to move the brush arm 47 and remove the resistor 42 gradually from the braking circuit under the control of the accelerating and braking relay ABR. During this operation the accelerating and braking relay is operated by its shunt coil 70 which is energized across a portion of the braking resistor 44. The operation of the relay during braking is similar to its operation during acceleration in that it tends to maintain a constant current through the motors. With both master controllers in their "off" positions the tension applied to the restraining spring 63 of the relay ABR will be a minimum. Therefore, only a relatively small amount of current flowing through the braking circuit is required to operate the braking relay. As the speed of the cars decreases the relay ABR tends to maintain this predetermined current and in this manner the "spotting" operation is carried out. Thus, if the vehicle were allowed to coast to a standstill, the brush arm 47 would have completed the entire braking sequence in carrying out its "spotting" operation.

Braking

Figure 9:
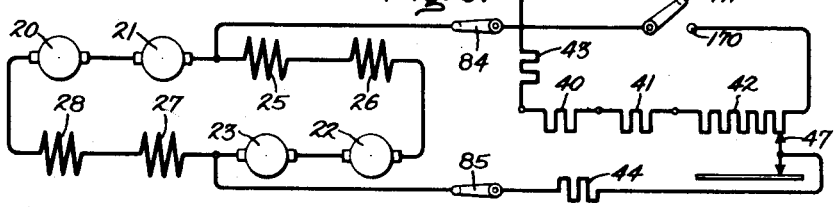

If now the braking controller 55 is moved from its "off" position sufficiently far to operate all its associated contact fingers, the control elements will be set for the minimum rate of braking. Referring now to the braking controller 55 it will be observed that the contact finger 149 is the first to open. The opening of the contact finger 149 disables the energizing circuit for the operating coils of the field shunting switches FS1 and FS3 as will be apparent from the circuit previously traced. The switches FS1 and FS3 therefore drop out to remove the shunt from the field windings 27 and 28 of the traction motors 22 and 23 and allow the braking current to build up. This is the first step of braking and is illustrated at Fig. 9. With the movement of the braking controller 55 the next contact finger to open is the finger 93. The opening of the contact finger 93 causes no change in any of the control circuits. It simply precludes the possibility of energizing either of the line breakers LB1 or LB2. The braking controller 55 next opens its contact fingers 160 and 145. The opening of the contact finger 160 merely disables the circuit of the discharge resistor 141 as previously pointed out. When the contact finger 145 of the braking controller 55 opens a short circuit is removed from a ballast resistor 162 and the resistor 162 is inserted in series with the shunt coil 70 of the braking relay ABR. This has the effect in changing the setting of the braking relay ABR from a low value for coasting to a higher value for braking.

A contact finger 163 of the braking controller 55 is in the circuit of a lock-out magnet LM. The lock-out magnet, when energized, serves to prevent the application of the air brakes. A lock-out relay LR is provided with an operating coil 164 shunted across the same portion of the braking resistor 44 as is the shunt coil 70 of the relay ABR. Therefore, when dynamic braking is established an energizing circuit is completed for the operating coil 165 and the lock-out magnet LM. This circuit may be traced from B+ through the control switch 72, the contact finger 163 of the braking controller 55, a contact segment 166 of the reverser 31, the contacts 167 of the lock-out relay LR, the contacts 168 of the braking contactor B3 and the energizing coil 165 of the lock-out magnet LM and to ground. This circuit is also completed during acceleration by a contact finger 168a of the controller 52 which shunts the contacts 168 of the contactor B3. Referring now to the braking controller 55 it will be observed that the energizing circuit for the lock-out magnet LM is maintained intact until the braking controller 55 is moved to its extreme full brake position. This is the emergency brake position in which both air and dynamic braking is operative.

Referring again to the operation of the controller 55, the only remaining contact finger is the finger 169. It will be observed that this finger is closed in substantially the whole "service" position of the controller 55. The contact finger 169 serves only to shunt the contact finger 82 of the master accelerating controller 54 and insures that the energizing circuits for the braking contactors B1 and B2 will not be disabled even if both controllers 54 and 55 are simultaneously operated. This is a safety feature which insures that braking rather than motoring will result if both the controllers 54 and 55 are simultaneously operated. Through the contact finger 169 the energizing circuits for the operating coils 73 and 74 of the braking contactors B1 and B2 are either maintained or established, depending upon the circuits established before simultaneous controller operation. As soon as the contactor B1 picks up it opens its contacts 91 in circuit with the operating coils 98 and 99 of the breakers LB1 and LB2 and either drops out these breakers or precludes their picking up.

Since now all the fingers of the braking controller 55 have been operated there is no function performed by this controller except to stretch the spring 63 of the braking relay ABR. Therefore, any further movement of the controller 55 serves only to increase the braking current due to the increased force required to operate the relay armature against the increased tension of the spring 63. By this means the rate of deceleration may be controlled by movement of the braking controller 55 within its "service" position.

Figure 10:
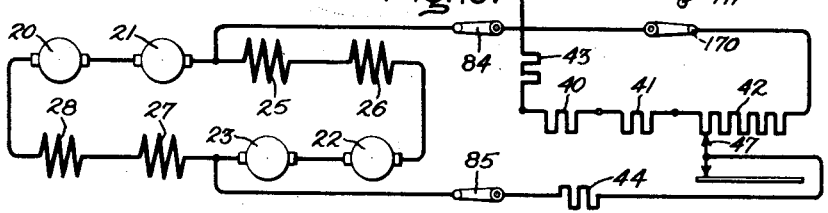

As previously pointed out during the dynamic braking sequence the accelerating resistor 42 is utilized twice rather than once as during the accelerating sequence. This is done by using the braking contactor B3 to re-insert the resistor 42 after it has been once removed by moving the brush 47 from its position A to its position B. Referring now to the controller 52, it will be observed that when the controller arrives at its B' position the control finger 158 is opened to disable the energizing circuit for the operating coil 125 of the contactor B3. This stage of the braking sequence is illustrated at Fig. 10. As previously pointed out, the position of the contactor B3 determines the direction of motion of the pilot motor 49. In dropping out the contactor B3 opens its contacts 130 and closes its contacts 129. The opening of the contacts 130 disables the circuit through the field winding 50 of the pilot motor 49, and the closing of the contacts 129 completes a circuit through the field winding 51 of the pilot motor 49 for operation of the motor in the opposite direction to move the brush arm 47 from its position B to its position A. It is believed that this energizing circuit for the pilot motor 49 will be obvious from the circuits previously traced. The brush arm 47 therefore proceeds toward its position A. When the brush arm 47 arrives at position A the power circuit will be as shown at Fig. 11 of the drawings.

In order to provide for an emergency application of dynamic braking I provide a "brake" position of the reverser 31. In this position the contact segment 166 bridges the contacts 166a and 166b to shunt all the braking contacts and resistors and establishes a very low resistance braking circuit directly through the contact segment.

*Reapplication of power and braking during acceleration*

It has already been observed that the braking contactor B3, through its contacts 129 and 130, determines the direction of operation of the pilot motor 49 controlling the brush arm 47. The contactor B3 has a pair of main contacts 170 and 171 by which the relation of the resistor 42 in the braking circuit is determined. By means of this braking contactor B3, then, the brush arm 47 is always maintained in approximately the proper position along the accelerating resistor 42 and the pilot motor 49 is immediately set into operation in the proper direction whenever control is shifted suddenly from the accelerating controller 54 to the braking controller 55 or vice versa.

As a first example, let it be assumed that the accelerating cycle is only partially completed so that the brush arm 47 has not yet arrived at its B position and that power is suddenly removed by placing the accelerating controller 54 back in its "off" position to allow the vehicle to coast. Under these conditions the braking contactor B3 will not yet have picked up because the contact finger 124 of the controller 52 will not yet have closed. Therefore, the contacts 170 of the contactor B3 will remain closed and a braking circuit will be established through the contacts 170 of the contactor B3 and that portion of the accelerating and braking resistor 42 lying between the position A and the position which the brush arm 47 has reached during the partial accelerating sequence. This circuit may be followed on Fig. 12. It will be noted that the braking circuit also includes a fixed resistor 44. It has been found that the proper amount of resistance to initiate braking at any given speed is approximately that which has been removed from the accelerating circuit plus some fixed resistance, in this case the resistor 44. If the vehicle is now allowed to coast, it will be recalled that all the dynamic braking circuits are established and spotting will take place. It will also be recalled that during the braking or coasting operation the direction of rotation of the pilot motor 49 is controlled by the position of the contactor B3. Since the contactor B3 is deenergized, a circuit will be established through the contacts 129 of the contactor B3 for the field winding 51 of the pilot motor. The energization of the field winding 51 of the pilot motor 49 causes operation of the pilot motor in a direction to move the brush arm 47 toward its position A. This means that the brush arm 47 will reverse its movement as soon as power is removed during the course of an accelerating cycle, and in thus reversing its movement it will immediately remove resistance from the dynamic braking circuit.

If under the above conditions dynamic braking is established by rotation of the braking controller 55, the operation of the contactor B3, the resistor 42, the brush arm 47 and the pilot motor 49 would be the same. The only change caused by operation of the braking controller 55 would be that the pick-up point of the braking relay ABR would be raised by the spring 63 to increase the dynamic braking current.

If the accelerating cycle has proceeded to such a point that brush arm 47 has reached its position B and begun its reverse travel toward its position A when the controller 54 is moved to its "off" position, it will be found that the brush arm 47 also reverses and begins immediately to remove the braking resistance from the circuit without having to return to its A position. Under the conditions now assumed the braking contactor B3 will have been energized through the contact finger 124 of the controlled 52 and will have locked itself in through its contacts 155 and the contact finger 158 of the controller 52. Therefore, when the braking or coasting circuits are established by movement of the controller 54 to its "off" position, these circuits will be established through the contacts 171 of the contactor B3 and in series through the resistors 43, 40, 41 and that portion of the resistor 42 between the B position of the brush arm 47 and that position which the brush arm 47 has reached in its reverse movement during acceleration. This braking circuit may be followed on Fig. 12. It is preferred to so proportion the resistors 40, 41, 42 and 43 that the sum of the resistance of the resistors 40, 41 and 43 is equal to the resistance of the resistor 42. Thus it will be seen that if coasting or braking is called for immediately after the brush arm 47 leaves its position B during an accelerating cycle, the braking circuit will include the fixed resistor 44 and approximately the same amount of resistance as has been removed from the motoring circuit. If, on the other hand, the brush arm 47 has proceeded to some further position between B and A, then a greater amount of resistance will be inserted in the braking circuit than was previously removed from the motoring circuit by the brush arm 47. However, since the speed of the vehicle is increased by field shunting during this further reverse movement of the brush arm, it is desirable that this additional resistance be inserted. It will now be observed that with power removed and the position of the brush arm 47 last assumed, the contactor B3 will have been picked up and therefore an energizing circuit will be established through the contacts 130 of the contactor B3 for the field winding 51 of the pilot motor 49. Energization of the field winding 51 of the pilot motor 49 causes the brush arm 47 to reverse its direction of movement and to move again toward its position B. This has the effect of cutting out the resistance inserted in the braking circuit under these conditions, namely, that resistance between the position B of the brush arm 47 and the position of the brush arm when power was removed from the motor.

It will now be apparent that if power is reapplied at any time after its removal while the vehicle is in motion, the brush arm 47 will proceed in the proper direction for a continuance of the accelerating sequence without first returning to its A position. From circuits previously traced it will be apparent that as the contacts 129 and 130 of the braking contactor B3 determine the direction of motion of the pilot motor 49 during its braking sequence, so the contacts 108 and 128 of the line breaker LB3 determine the direction of motion of the pilot motor 49 during an accelerating sequence. Therefore, if power has been removed during an accelerating sequence before the brush arm 47 arrived at its B position, the brush arm would, as previously described, begin to move in a reverse direction toward its A position. If now, power is reapplied before the brush arm 47 arrives at its A position a circuit will be reestablished for the field winding 50 of the pilot motor 49 through the contacts 108 of the line breaker LB3, which is still in its open position. Also, as has already been described, the braking contactors B1 and B2 will be deenergized and the line contactors LB1 and LB2 will pick up to close the motoring circuit. Furthermore, it has also been pointed out that the cushioning contactors C1 and C2 will pick up sequentially to remove the resistors 40 and 41 from the motoring circuit.

If a removal of power has occurred after the brush arm 47 arrived at its B position and began its reverse movement back to its A position, and power is then reapplied, the brush arm 47 will also continue its accelerating movement from the position reached when power was reapplied without returning to its A position. First let it be assumed that during the coasting period the brush arm 47, in moving back toward the B position, has not yet reached this position when power is reapplied. Under these conditions the line breaker LB3, having already been energized during the accelerating cycle, would have been dropped out upon removal of power by the opening of the interlock contact 112 of the cushioning contactor C1. The braking contactor B3 will remain energized, however, until the B' position of the controller 52 is reached. Since power is assumed to be reapplied before the controller 52 reaches its B' position and thus before the contact finger 114a is closed, the line breaker LB3 will be reenergized upon the reapplication of power through the parallel connected interlock contact 114b of the braking contactor B3. Therefore, the contacts 108 of the breaker LB3 will be open and the contacts 128 of the breaker will be closed to establish a circuit through the field winding 51 of the pilot motor 49. The completion of a circuit through the field winding 51 of the pilot motor 49 causes the motor to rotate in such a direction that the brush 47 will continue its accelerating movement toward its A position.

Let it now be further assumed that power was removed after the brush arm 47 had arrived at its B position and begun its reverse movement but that during the coasting period of the vehicle, the vehicle had so decreased in speed that the brush arm 47, in moving back toward the B position, had arrived at this position and again begun its reverse movement toward its A position in carrying out its "spotting" or braking operation. Under these conditions the line breaker LB3, having already been closed during the accelerating cycle, would be deenergized after the removal of the power by the opening of the contact 112 of the cushioning contactor C1. As the coasting period continues to the point where the brush arm 47 arrives at its B position, the braking contactor B3 would be dropped out at the B position of the brush 47 by the opening of the contact finger 158 associated with the controller 52. Therefore, under the conditions assumed, when power is reapplied both the contactor B3 and the breaker LB3 will be deenergized, and therefore a circuit will be established for the field winding 50 of the pilot motor 49 through the contacts 108 of the line breaker LB3. Such energization of the pilot motor field winding will result in movement of the pilot motor in a direction to move the brush arm 47 toward its position B without a return to its position A.

It will now be obvious that I have provided an arrangement wherein if power is removed at any point during an accelerating cycle a dynamic braking circuit is immediately established which includes the permanent resistance 44 and that amount of resistance which has already been cut out during the partially completed accelerating cycle, and a dynamic braking sequence is begun by immediately reducing the resistance of the braking circuit without first increasing it to its maximum initial value. Furthermore, I have provided means by which, if power is reapplied before a braking sequence is complete, a motoring circuit is set up including approximately the correct amount of accelerating resistance for the speed at which the vehicle is traveling upon the reapplication of power, and a new accelerating cycle is initiated from this point by reducing the accelerating resistance without first increasing it to its maximum initial value.

Back-up control

According to the illustrated embodiment of my invention a separate controller 60 is provided for reverse operation of the vehicle. In order to operate the vehicle from the back-up controller 60 the braking controller 55 is placed in its emergency full brake position and retained in this position by a latch provided for the purpose. As will be apparent from the foregoing description, the dynamic braking circuits will then be established, but, with the cars at standstill, no braking is obtained. Furthermore, with the braking controller 55 in its emergency position the lock-out magnet LM is deenergized because the energizing circuit for its operating coil 165 is disabled at the contact finger 163 of the braking controller 55. Therefore, in this position of the controller the air brakes are applied and the dynamic braking circuits are set up. For reverse operation it is also necessary to place the reverser 31 in its "reverse" position.

Movement of the back-up controller 60 from its "off" position to its "coast" position closes the contact finger 180 of the controller 60 to complete an energizing circuit for the operating coil 165 of the lock-out magnet LM. This circuit may be traced from B+ through the control switch 72, the contact finger 180, the wire 181 and the operating coil 165 to ground. In the "coast" position of the controller 60 a contact finger 182 is also closed to shunt the ballast resistor 162 in the circuit with the shunt coil 70 of the accelerating and braking relay ABR. It will be noted that the contact finger 182 of the controller 60 serves the same purpose as the contact finger 145 of the braking controller 55, that is, it insures that in coasting the accelerating and braking relay ABR is set for a low pick-up by the short circuiting of the ballast resistor 162.

When the back-up controller 60 is moved to its "switching" position its contact finger 78 is opened and the fingers 183 and 184 are closed. The opening of the contact finger 78 of the controller 60 results in the deenergization of the operating coils 73 and 74 of the braking contactors B1 and B2 respectively, as will be evident from the energizing circuit previously traced for these coils. The closing of the contact finger 184 of the controller 60 completes an energizing circuit for the operating coils 98 and 99 of the line breakers LB1 and LB2 respectively. This circuit may be traced from B+ through the control switch 72, the contact finger 184, and in parallel through the contact 97 of the overload relay OLR and the coil 98 of the line breaker LB1 and through the contacts 91a of the overload relay OLR1 and the operating coil 99 of the line breaker LB2 to the contacts 91 of the braking contactor B1, and then through these contacts to ground. The closing of the contact finger 183 of the controller 60 completes an energizing circuit for the operating coil 92 of the line breaker LB4. This circuit may be traced from B+ through the control switch 72, the contact finger 183, the operating coil 92, and the contacts 91 of the braking contactor B1 to ground. With the line breakers LB1, LB2 and LB4 closed, reverse operation will proceed at low speed with all the accelerating resistors in the motor circuit. As long as the controller 60 is held in its "switching" position the pilot motor 49 will not be energized and therefore no resistance will be removed from the motor circuit to accelerate the traction motors.

When the back-up controller 60 is moved to its "power" position the contact finger 185 is closed to complete an energizing circuit for the operating coil 100 of the cushioning contactor C1. This circuit may be traced from the trolley 45 through the contacts 101 of the line breaker LB1, the wire 102, the operating coil 100 of the contactor C1, the wire 103, the contact finger 185, the contacts 104 of the line breaker LB2 and the line connection 46 to ground. When the contactor C1 picks up it short circuits the accelerating resistor 40 through its contacts 105 and completes an energizing circuit previously traced for the pilot motor 49 through its interlock contacts 109. If now the controller 60 is held in its "power" position with the braking controller 55 maintained in the position assumed, acceleration in the reverse direction will proceed at a fixed rate depending upon the position of the braking controller 55. In this sequence the cushioning contactor C2 will be forced in only after the field shunting switch FS3 has picked up. The energizing circuit for the operating coil 136 of the field shunting switch FS3 is the same as that previously traced except that it passes through the contact finger 83 of the back-up controller 60 instead of through the contact finger 93 of the braking controller 55. The energizing circuit for the operating coil 113 of the cushioning contactor C2 passes through the contacts 140 of the field shunting switch FS3. It is believed that the remainder of this circuit will be obvious from circuits traced hereinbefore.

Attention is directed to the fact that the coasting connections from the back-up controller 60 differ from normal in that coasting is set up with full field. This is due to the fact that with the braking controller 55 in its full brake position the contact finger 149 is opened to disable the energizing circuit previously traced for the field shunting switches FS1 and FS3. The opening of the contact finger 78 does not interfere with the operation of the field shunting switches FS1 and FS3 during acceleration in the reverse direction, since the energizing circuits for these switches during such acceleration do not pass through the contact finger 78.

*Overload protection*

To protect against overloads I have provided the overload relays OLR and OLR₁. These relays are operated by series coils 200 and 201 respectively in the power circuit and held in picked up position by the shunt coils 202 and 203 respectively in the control circuit. Referring to the relay OLR, by way of example, it will be observed that when the series coil 200 is energized sufficiently to operate the relay, the relay will open its contacts 97 to disable the operating coil 98 of the line breaker LB1 and will close its contacts 204 to complete an energizing circuit for its own holding coil 202. It will be apparent that the relay OLR₁ similarly de-energizes the line breaker LB2.

While I have described a particular preferred embodiment of my invention in accordance with the provisions of the patent statutes, I wish to have it understood that no limitation to this particular embodiment is intended, and I, therefore, contemplate by the appended claims to cover any changes in the mode of application, the manner of formation, and in fact all variations and modifications as will constitute no departure from the true spirit and scope of my invention.

What I claim as new and desire to secure by Letters Patent of the United States is:

1. In a control system for an electrically driven vehicle, the combination of a driving motor, a braking resistor for said motor, electroresponsive switching means for varying the resistance of said resistor, switching means for establishing a braking circuit for said driving motor including said resistor in one of a plurality of closed circuit relations, and means operable in accordance with the speed of said vehicle to select said one circuit relation.

2. In a control system for an electrically driven vehicle, the combination of a driving motor, a braking resistor for said motor, electroresponsive switching means for varying the resistance of said resistor, switching means for establishing a braking circuit for said driving motor including said resistor in one of a plurality of closed circuit relations, means operable in accordance with the speed of said vehicle to select said one circuit relation, and means for controlling said electroresponsive switching means in response to the position of said switching means.

3. In a control system for an electrically driven vehicle, the combination of a driving motor, a braking resistor for said motor, reversible means for varying the resistance of said resistor, switching means for establishing a braking circuit for said motor including said resistor in one of a plurality of closed circuit relations, and means responsive to the position and direction of motion of said reversible means for selecting said one circuit relation.

4. In a control system for an electrically driven vehicle, the combination of a driving motor, a braking resistor for said motor, reversible means for varying the resistance of said resistor, switching means for establishing a braking circuit for said motor including said resistor in one of a plurality of closed circuit relations, means responsive to the position and direction of motion of said reversible means for selecting said one circuit relation, and means for controlling said reversible means responsive to the position of said switching means.

5. In a control system for an electrically driven vehicle, the combination of a driving motor, a braking resistor for said motor, electroresponsive means for varying the resistance of said resistor, first switching means for establishing a braking circuit for said motor including said resistor, and second switching means operable in response to the speed of said vehicle to select the relation of said resistor in said braking circuit.

6. In a control system for an electrically driven vehicle, the combination of a driving motor, a braking resistor for said motor, a pilot motor for varying the resistance of said resistor, first switching means for establishing a braking circuit for said driving motor including said resistor, second switching means operable in response to the speed of said vehicle to select the relation of said resistor in said braking circuit, and means for controlling said pilot motor responsive to the position of said second switching means.

7. In a control system for an electrically driven vehicle, the combination of a driving motor, a braking resistor for said motor, reversible means for varying the resistance of said resistor, switching means for establishing a braking circuit for said motor, second switching means responsive to the position and direction of motion of said reversible means arranged to include said resistor in said braking circuit in one of a plurality of closed circuit relations, and means for controlling said reversible means in response to the position of said second switching means.

8. In a control system for an electrically driven vehicle, the combination of a driving motor, a braking resistor for said motor, a reversible pilot motor for varying the resistance of said resistor, a controller operated by said pilot motor, first switching means for establishing a braking circuit for said driving motor, second switching means operable in response to the position of said controller for including said resistor in said braking circuit in one of a plurality of closed circuit relations, and reversing means for said pilot motor operated by said second switching means.

9. In a control system for an electrically driven vehicle, the combination of a driving motor, a starting and braking resistor for said motor, first switching means for connecting said motor and said resistor in series circuit to a source of power, a reversible pilot motor for gradually removing said resistor from said circuit, shunting means for said resistor, operating means for said shunting means operable upon reversal of said pilot motor while said driving motor is connected to said source of power, second switching means for establishing a dynamic braking circuit for said driving motor, third switching means responsive to the position and direction of operation of said pilot motor arranged to connect said resistor in said braking circuit in one of a plurality of circuit relations, and means responsive to the position of said third switching means for controlling the direction of operation of said pilot motor after operation of said second switching means.

10. In a control system for an electrically driven vehicle, the combination of a driving motor, a starting and braking resistor for said motor, first switching means for connecting said motor and said resistor in series circuit to a source of power, a reversible pilot motor for gradually removing said resistor from said circuit, a controller operated by said pilot motor, shunting means for said resistor, reversing means for said pilot motor, means associated with said controller for simultaneously operating said reversing means and said shunting means after said resistor has been completely removed from said circuit, second switching means for establishing a dynamic braking circuit for said driving motor, third switching means operable in response to the position of said controller to include said resistor in said dynamic braking circuit in one of a plurality of circuit relations, means for disabling said reversing means upon operation of said second switching means, and means responsive to the position of said third switching means for controlling the direction of operation of said pilot motor after operation of said pilot motor after operation of said second switching means.

11. In a control system for an electrically driven vehicle, the combination of a driving motor, a plurality of fixed resistors and a variable resistor, first switching means for connecting said motor and said resistors in series to a source of power, a reversible pilot motor for gradually removing said variable resistor from said circuit, shunting means for each of said resistors, interlocked operating means for first operating the shunting means of said fixed resistors sequentially then energizing said pilot motor for operation in one direction and to remove said variable resistor from said circuit and finally shunting said variable resistor while energizing said pilot motor for operation in the reverse direction, second switching means operable upon deenergization of said first switching means to establish a dynamic braking circuit for said driving motor, third switching means responsive to the position and direction of operation of said pilot motor to include said resistors in said dynamic braking circuit in one of a plurality of circuit relations, said circuit relations being such that if said second switching means is energized while said pilot motor is operating in said one direction said dynamic braking circuit will include only that portion of said variable resistor removed from said starting circuit, while if said second switching means is energized during operation of said pilot motor in said reverse direction said dynamic braking circuit will include said fixed resistors and the portion of said variable resistor included by reverse movement of said pilot motor, and means responsive to the position of said third switching means arranged to control the direction of operation of said pilot motor after operation of said second switching means.

12. In a motor control system for an electrically driven vehicle, the combination of a driving motor, a variable starting and braking resistor, first switching means for establishing a starting circuit including said motor and said resistor, movable means for gradually removing said resistor from said starting circuit to carry out an accelerating sequence, second switching means for establishing a braking circuit including said motor and said resistor, means including said first and second switching means for reestablishing a starting circuit, and means including said movable means for immediately initiating a new accelerating sequence with the initial resistance of said resistor proportioned in accordance with the speed of the vehicle at the moment of reestablishment of said starting circuit.

13. In a control system for an electrically driven vehicle, the combination of a driving motor, a variable starting and braking resistor for said motor, a reversible pilot motor having an initial position and arranged to vary the resistance of said resistor, first switching means for establishing a starting circuit including said driving motor and said resistor, means for energizing said pilot motor for operation to remove said resistor from said starting circuit, second switching means to establish a braking circuit including said driving motor and said resistor, said second switching means being operable when said pilot motor has reached any desired second position, control means including said pilot motor for initiating a braking cycle immediately upon operation of said second switching means, means including said first and second switching means for reestablishing said starting circuit when said pilot motor has reached any desired third position, and second control means including said pilot motor for initiating a second accelerating cycle from said third position of said pilot motor.

14. In a control system for an electrically driven vehicle, the combination of a driving motor, a variable accelerating and braking resistor for said motor, a reversible pilot motor for varying the resistance of said resistor, first switching means arranged to establish a starting circuit for said driving motor including said resistor, second switching means arranged to establish a braking circuit for said driving motor including said resistor in one of a plurality of circuit relations, controller means for selectively connecting either of said circuits while said vehicle is in motion, third switching means for selecting said one circuit relation in response to the position and direction of operation of said pilot motor upon operation of said second switching means, first reversing means for said pilot motor operable while said first switching means is energized, and second reversing means for said pilot motor responsive to the position of said third switching means, said second reversing means when said second switching means is energized.

15. In a control system for an electrically driven vehicle, the combination of a driving motor, a variable accelerating and braking resistor for said motor, electroresponsive switching means for varying the resistance of said resistor, first switching means arranged to establish a starting circuit for said driving motor including said resistor, second switching means arranged to establish a braking circuit for said driving motor including said resistor in one of a plurality of circuit relations, controller means for selectively connecting either of said circuits while said vehicle is in motion.

16. In a control system for an electrically driven vehicle, the combination of a driving motor, a variable accelerating and braking resistor for said motor, a reversible pilot motor for varying the resistance of said resistor, first switching means arranged to establish a starting circuit for said driving motor including said resistor, second switching means arranged to establish a braking circuit for said driving motor including said resistor on one of a plurality of circuit relations, controller means for selectively connecting either of said circuits while said vehicle is in motion, third switching means for selecting said one circuit relation and operable in accordance with the speed of the vehicle when said second switching means is operated, a plurality of reversing means for said pilot motor, and control means operable in accordance with the position of said controller for selectively connecting said reversing means to said pilot motor.

17. In a control circuit for an electrically driven vehicle, the combination of a driving motor, a plurality of accelerating resistors connected in series with said motor, switching means for connecting said motor and said resistors to a source of power, first operating means for said switching means, means for shunting each of said resistors, second operating means for said shunting means, interlocked control means associated with said second operating means arranged to shunt said resistors sequentially to start said motor and to unshunt said resistors sequentially upon disconnection of said motor from said source of power, and time element means associated with said first operating means to delay the disabling of said first operating means until said interlocked control means has operated.

18. In a control circuit for an electrically driven vehicle, the combination of a driving motor, a plurality of accelerating resistors connected in series with said motor, first switching means for connecting said motor and said resistors to a source of power, first operating means for said switching means, second switching means for connecting said motor and said resistors in a dynamic braking circuit, second operating means for said second switching means, controller means for selectively energizing said first and second operating means, means for shunting each of said resistors, a third operating means for operating said shunting means, interlocked control means associated with said third operating means arranged to shunt said resistors sequentially to start said motor and to unshunt said resistors sequentially upon disconnection of said motor from said source of power, time element means associated with said first operating means to prevent disabling of said first operating means until after said control means has operated, and means associated with said controller means for disabling said time element means.

19. In a dynamic braking system, the combination of a driving motor, a braking resistor for said motor, first switching means for connecting said resistor in a circuit relation selected in accordance with the speed of the vehicle, and second switching means for connecting said resistor to said motor to complete a dynamic braking circuit.

JOHN F. TRITLE.